United States Patent [19]
David

[11] 3,774,321
[45] Nov. 27, 1973

[54] SNOWBLOWER ADAPTER MEANS

[76] Inventor: Leonard E. David, 7422 Galoway, Wichita, Kans.

[22] Filed: Sept. 10, 1971

[21] Appl. No.: 179,311

[52] U.S. Cl. .................................. 37/43 L, 74/11
[51] Int. Cl. .............................................. E01h 5/00
[58] Field of Search ...................... 37/43, 53; 74/11

[56] References Cited
UNITED STATES PATENTS

| | | | |
|---|---|---|---|
| 3,131,491 | 5/1964 | Durrschmidt | 37/43 L |
| 2,871,585 | 2/1959 | Merry et al. | 37/43 R |
| 1,484,380 | 2/1924 | Runck | 37/43 E |
| 3,440,740 | 4/1969 | Kamlukin | 37/43 R |
| 3,468,041 | 9/1969 | Mattson et al. | 37/43 E |
| 2,797,502 | 7/1957 | Griffith et al. | 37/43 L |
| 3,319,363 | 5/1967 | Kennedy | 37/43 L |
| 3,305,949 | 2/1967 | Holley | 37/43 R |
| 3,398,470 | 8/1968 | Pool et al. | 37/43 E |
| 1,562,180 | 11/1925 | Miller | 37/43 E |
| 3,267,594 | 8/1966 | Mattson et al. | 37/53 X |

FOREIGN PATENTS OR APPLICATIONS 564,379  10/1958  Canada ................................. 37/43

*Primary Examiner*—Robert E. Pulfrey
*Assistant Examiner*—Eugene H. Eickholt
*Attorney*—Phillip A. Rein

[57] ABSTRACT

This invention relates to a snowblower adapter means operable to be attached to conventionally available lawn mower structures and having means to receive its power from such lawn mower structures. More particularly, this invention is a snowblower adapter means having rotatable blade and auger assemblies to move snow inwardly within a housing to throw the same outwardly through a discharge spout where desired. The housing assembly of the snowblower adapter assembly of this invention is designed to achieve the maximum efficiency utilizing the same in snow of a depth greater than the diameter of the blade and auger structure.

2 Claims, 10 Drawing Figures

Patented Nov. 27, 1973

INVENTOR.
LEONARD E. DAVID

BY
Phillip O. Been
ATTORNEY

Patented Nov. 27, 1973
3,774,321
2 Sheets-Sheet 2
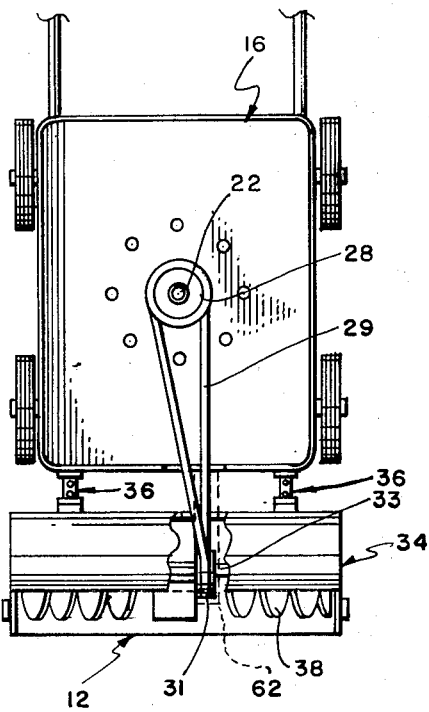
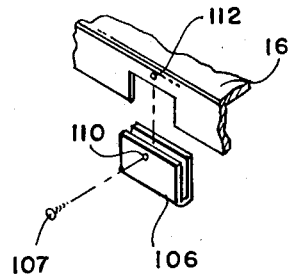
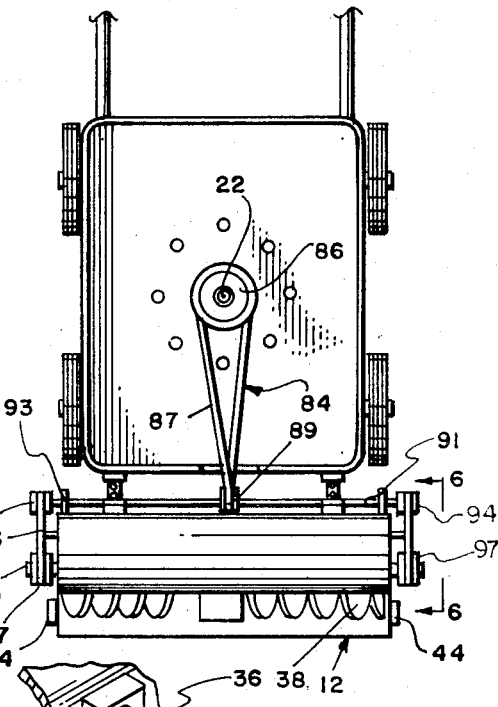
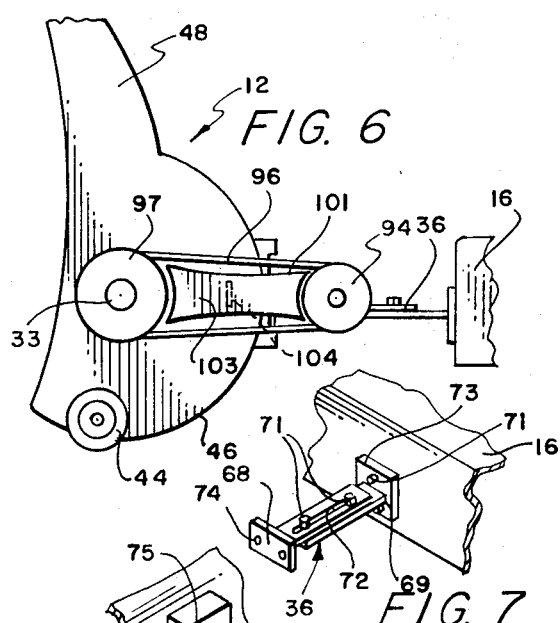
INVENTOR.
LEONARD E. DAVID
BY
*Phillip A. Rein*
ATTORNEY

SNOWBLOWER ADAPTER MEANS

Numerous adapter structures are known to the prior art which may be attached to a garden tractor or perhaps even a lawn mower structure but such prior art devices are limited in efficiency and adaptability for utilizing the power drive of a lawn mower structure in an efficient and effective manner. Additionally, the prior art snow remover attachment structures are limited in the depth of snow to which they can be utilized due to the structure thereof and limited power available from the lawn mower structure to which it is attached. Also, the prior art structures tend to become clogged with snow so as to require a greater power output with less efficiency and, therefore, are not operable in a desirable manner.

In one preferred embodiment of this invention, a power means is utilized to drive a snowblower adapter means and the power means may be a lawn mower having an internal combustion engine to rotate an upright drive shaft. The snowblower adapter means includes a first drive adapter assembly operable to connect a blower assembly to the lawn mower structure to receive power therefrom. The drive adapter assembly includes first and second pulleys interconnected by a drive belt to a driven auger shaft mounted within the blower assembly. The blower assembly includes a housing assembly connected to the lawn mower assembly by a mounting assembly; a auger assembly mounted within the housing means for rotation therewithin; and a discharge assembly secured to the housing means operable to receive and direct snow to be discharged therefrom. The housing assembly includes a housing member mounted upon support wheels to give additional vertical support while utilizing the same. The housing member includes a first semi-circular main section adapted to enclose the auger assembly and having integral therewithin an upper arcuate flange section operable to direct the snow downwardly into the auger assembly for proper discharge thereof. The auger assembly includes the driven auger shaft having propeller members secured to the outer ends thereof to drive the snow inwardly to adjacent auger blade members secured to the driven shaft and having centrally thereof a discharge paddle blade operable to send the snow upwardly into the discharge assembly. The discharge assembly includes a main upright support tube having rotatably connected to the upper end thereof a funnel member to discharge the snow outwardly from the path being cleared by the auger assembly. The mounting assembly includes three embodiments illustrated provided means for attaching the housing means to the lawn mower structure in a rigid manner and also allowing the same to be adjusted laterally and vertically as required on lawn mowers of various sizes and provides means to adjust the proper tension to the drive belt. Also, a second embodiment of the drive adapter assembly is an intermediate drive adapter assembly having a drive belt member operably connected to an intermediate pulley member to drive an intermediate drive shaft which has outer ends thereof connected by driven belt members to pulley members which, in turn, are secured to the outer ends of the driven auger shaft to achieve greater efficiency in the powering of the blower assembly.

One object of this invention is to provide a snowblower adapter means overcoming the aforementioned disadvantages of the prior art devices.

Another object of this invention is to provide a snowblower adpater means which is readily connected to a conventionally available power means such as a lawn mower structure and having means therewith to be attached to the upright drive shaft of the lawn mower structure for removing snow therewith not requiring the additional expense of a second power means therefore.

Still, one further object of this invention is to provide a snowblower adapter means having a drive adapter assembly connected to a conventional lawn mower structure operable to drive a blower assembly, the blower assembly including a housing means mounted about an auger assembly having the housing means of a new and novel arcuate design so as to be efficient in large depths of snow although utilizing a smaller auger structure.

Still, another object of this invention is to provide a snowblower adapter means having a housing means constructed of a molded plastic material so that the same operates efficiently as the snow would not adhere to the plastic material.

One other object of this invention is to provide a snowblower adapter means which can be readily attached to a conventional lawn mower structure having the same rigid in construction, easy to attach and detach to existing lawn mower structures, and effectively operable on the power output available from lawn mower structures for snow removing operations.

Various other objects, advantages, and features of the invention will become apparent to those skilled in the art from the following discussion, taken in conjunction with the accompanying drawings, in which:

FIG. 4 is a bottom plan view of the lawn mower structure and snowblower adapter means secured thereto;

FIG. 5 is a view similar to FIG. 4 illustrating another embodiment of a drive adapter assembly of the snowblower adapter means of this invention;

FIG. 6 is an enlarged, fragmentary, view taken along line 6—6 in FIG. 5;

FIGS. 7, 8, and 9 are various embodiments of a mounting assembly for connecting the snowblower adapter means of this invention to the lawn mower structure; and FIG. 10 is a fragmentary view of the forward portion of a lawn mower structure having a plate member connectable thereto to cover up the opening utilized for the drive adapter assembly of this invention.

Figure 1:
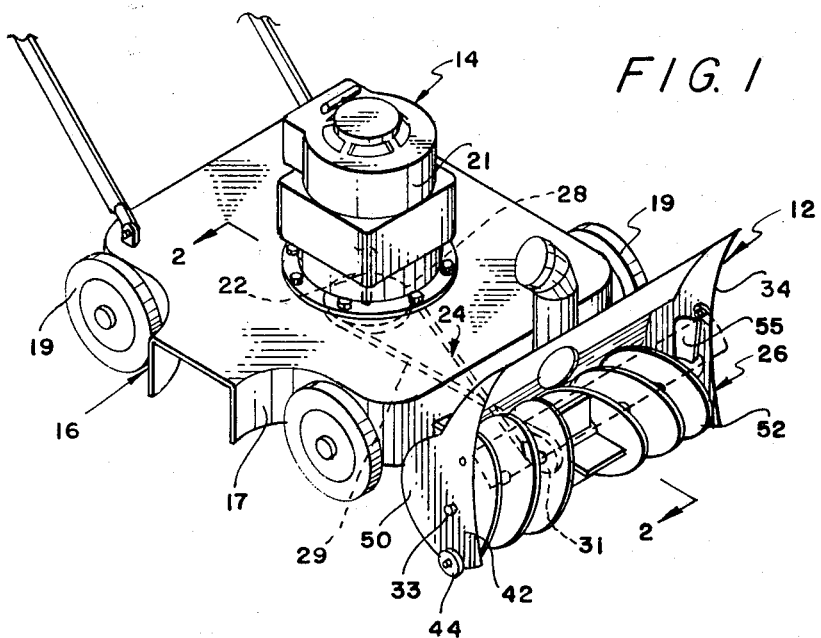
FIG. 1 is a perspective view of a lawn mower structure having the snowblower adapter means of this invention connected thereto.
Figure 2:
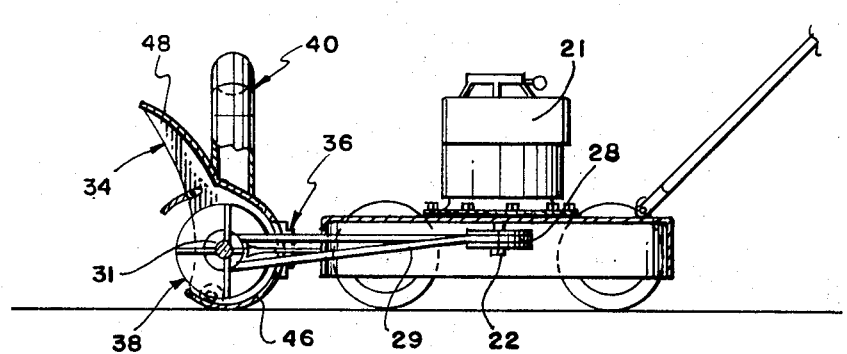
FIG. 2 is a sectional view taken along line 2—2 in FIG. 1.

Referring to the drawings in detail and, more particularly to FIG. 1, the snowblower adapter means of this invention, indicated generally at 12, is shown as attached to a power means 14 for operation of the same. The power means 14 may be of various types but herein is disclosed a lawn mower structure 16 including a support body 17 mounted on wheels 19 and having an engine member 21 mounted thereon. The engine member 21 is provided with an upright drive power shaft 22 which, in summer operation, is attached at its lower end to a lawn mower blade (not shown) for the normal grass cutting operation. It is the desire and function of this invention to provide a snowblower adapter means 12 which can be readily attached to the conventional lawn mower structure 16 during the periods of wintertime for snow removal when such structure is normally in storage and inactive.

The snowblower adapter means 12 includes a first drive adapter assembly 24 operably connected between the drive power shaft 22 and a blower assembly 26. The drive adapter assembly 24 includes 1) a first pulley 28 which is attached to the lower end of the drive power shaft 22; 2) a drive belt 29 to connect the first pulley 28 to a second pulley 31; and 3) the second pulley 31 is secured about a driven auger shaft 33 of the blower assembly 26. As shown in FIGS. 1 and 4, the drive belt 29 is twisted 90° to receive the power drive from the upright drive power shaft 22 to the generally horizontal driven auger shaft 33.

The blower assembly 26 includes a first enlarged housing means 34 secured as by a mounting assembly 36 to the lawn mower structure 16 and having within the housing means 34 an auger assembly 38 operably connected to a main discharge assembly 40 for directing and throwing the snow therefrom as will become obvious.

The housing means 34 includes a first housing member 42 supported on spaced support wheels 44 on opposite sides thereof. The housing member 42 includes a semi-circular base section 46 open forwardly and interconnected to an upper arcuate flange section 48 to receive and direct the snow downwardly thereof. The semi-circular base section 46 is closed at oppostie ends by end walls 50 and 52 having the support wheels 44 rotatably mounted on the exterior thereof. The upper, arcuate flange section 48 is directed upwardly and forwardly a substantial distance above the auger assembly 38 so as to be effective in moving snow of substantial depths greater than the diameter of the auger assembly 38.

Figure 3:
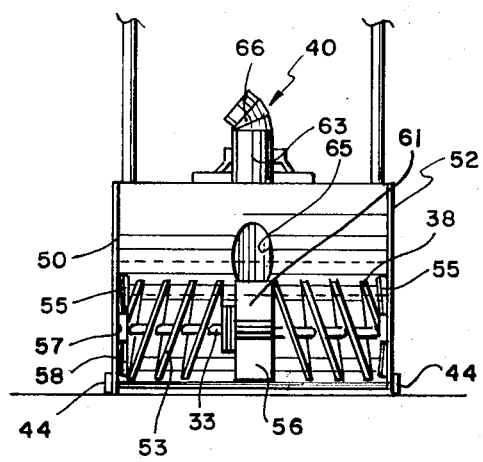
FIG. 3 is a front, elevational view of the lawn mower structure and interconnected snowblower adapter assembly of this invention secured thereto.

The auger assembly 38 includes the main driven auger shaft 33 having auger blade members 53 mounted thereon along with outer propeller assemblies 55 and having centrally mounted thereon a discharge paddle blade 56. The auger shaft 33 is mounted in bearing members 57 at opposite ends thereof within the end walls 50 and 52, respectively of the housing member 42 so as to rotate therewith. The outer propeller assemblies 55 includes a blade 58 operable to pick up the snow adjacent the outer corners thereof and throw the same inwardly. As shown in FIG. 3, the auger blade members 53 are of a generally spiral shape so as to pick up and move the snow inwardly towards the discharge paddle blade 56. The paddle blade member 56 is provided with a plurality of quadrant paddle elements 61 operable to pick up the snow particles on rotation of the driven auger shaft 33 and throw the same upwardly and outwardly through the discharge assembly 40. Additionally, it is seen that a protector guard 62 is mounted about the driven pulley 31 on the auger shaft 33 so as to prevent the same from being clogged by snow particles, ice, and the like.

The discharge assembly 40 includes a first, upright support tube member 63 mounted on the central, upper portion of the housing member 42 about an opening 65 having a rotatable funnel member 66 mounted on the upper end of the support tube member 63. The funnel member 66 is provided at a substantially 45° angle upwardly and outwardly inclined relative to the support tube member 63 and the same may be rotatable about its central axis so as to throw the snow as far as possible away and in a selected direction from the path of travel of the snowblower adapter means 12.

As shown in FIGS. 7, 8, and 9, the mounting assembly 36 is provided with various embodiments so as to be attached to a conventional lawn mower structure 16. In the embodiment of FIG. 7, it is seen that the mounting assembly 36 includes first and second connector members 68 and 69, respectively, interconnected through bolt members 71 in slots 72 so as to provide for lateral adjustment and tightening of the belt member 29 on mounting the same on the forward portion of the lawn mower structure 16 and against the rearward portion of the housing member 42. It is seen that this forward adjustment then allows for the tightening of the belt member 29 as required and, along with the support wheels 44, provides for the necessary vertical support of the snowblower adapter means 12. The connector members 68 and 69 are provided in the central portion with the slots 72 and having perpendicularly extended support elements 73 at opposite ends thereof provided with holes 74 therewithin to receive the bolt members 71 for securing the same in a rigid manner.

In the second embodiment of the mounting assembly 36, as shown in FIG. 8, an enlarged connector block 75 is illustrated secured by bolt members to the forward portion of the lawn mower structure 12 and having connector members 68 and 69 similar to that of FIG. 7 connected thereto. More specifically, the connector block 75 is provided with holes therewithin whereupon one of the first and second connector members 68 and 69 can be bolted thereto and operates in a manner similar to that of FIG. 7 except that there is provided not only horizontal but vertical adjustment of the mounting assembly 36.

In the third embodiment of the mounting assembly 36 as shown in FIG. 9, the same is provided with the same connector block 75 and connector members 68 and 69. However, elongated slots 81 are provided in the connector block 75 so that the structure is given unlimited vertical adjustment in the slots 81 similar to the unlimited horizontal adjustment formed by the slots 72 and bolt members 71 of the connector elements 68 and 69. Therefore, it is seen that through the three embodiments of the mounting assemblies 36, the ultimate in adjustability can be obtained in attaching the snowblower adapter means 12 of this invention to various lawn mower structures 16 as it is understood that such structures will vary somewhat in size, shape and deminsion but this invention is adapted to be universally connected thereto.

Another embodiment of the drive adapter assembly 24 is shown in FIGS. 5 and 6, being an intermediate drive adapter assembly 84. The intermediate drive adapter assembly 84 includes a first pulley member 86 mounted on the drive power shaft 22 having connected thereto a belt member 87 which is interconnected to an intermediate driven pulley 89, in turn, secured to an intermediate driven shaft 91 extending the width at the rearward portion of the snowblower adapter means 12. The outer ends of the intermediate driven shaft 89 is supported in bearing members 93 and having each end thereof provided with a pulley member 94 which is connected by a second belt member 96 to a driven pulley member 97 secured to outer opposite ends of the driven auger shaft 33. It is seen that the use of an additional intermediate driven shaft 91 and pulley members 94 and 97 provides for even more balanced powering of the auger assembly 38 which is necessary in icy conditions and other various conditions of the snow being removed.

As shown in FIG. 6, it is seen that the intermediate drive adapter assembly 84 is also provided with a snow guard assembly 101 having arcuate members 103 secured as by support members 104 to the respective end walls 50 and 52 of the housing means 34, the purpose of the same being to provide for a guard and scrapper member to maintain the pulley members 94 and 97 and belt member 96 thereabout in a condition free of ice and snow for the efficient and effective operation thereof.

As shown in FIG. 10, a shield member 106 and bolt member 107 is provided to cover up the openings through which the belt members 29 and 87 of the various ones of the drive adapter assemblies 36 and 84, respectively, are utilized so that the same may be covered up for usage of the lawn mower structure 16 during summer operations to keep debris, rocks, etc. from being thrown therethrough as a safety means. The shield member 106 is of generally U-shape so as to fit about the forward portion of the lawn mower structure 16 and having the bolt member 107 mounted within holes 110 and 112 to secure the same thereto in a clamping action.

In the use and operation of the snowblower adapter means 12 of this invention, it is seen that the same may be readily attached to the lawn mower structure 16 shown in FIG. 1 by the removal of the conventional lawn blade member (not shown) and securing thereto the first pulley 28 on the upright drive shaft 22. Next, the shield member 106 may be removed from the forward portion of the lawn mower structure 16 and the snowblower adapter means 12 may be secured as by one of the various mounting assemblies 36 to the forward vertical portion of the lawn mower structure 16. At this time the snowblower adapter means 12 can be adjusted in horizontal and vertical directions so as to provide the proper alignment of the drive pulley with the driven pulley 31 which may thereupon be interconnected by the belt member 29. At this time, the funnel member 66 can also be adjusted as desired. Next, a lawn mower structure 16 started in a conventional manner whereupon the upright power shaft 22 thereupon operates to rotate the auger assembly 38 to move the snow inwardly for discharge by the discharge paddle blade 56 upwardly through the discharge assembly 40 in the desired and choosen direction. It is seen that the outer propeller blade members 58 of the auger assembly 38 operate to throw the snow inwardly to be picked up by the auger blade members 53 for movement toward the center thereof. The rotating paddle elements 61 operate to pick up and throw the snow through the discharge assembly 40. Additionally, it is seen that the arcuate flange section 48 of the housing member 42 is very desirable as it operates to direct the snow downwardly into the auger assembly 38 for proper discharge. Without this upper arcuate flange section 48, it is seen that the snowblower adapter means 12 would be limited in depth usage and, by this specific structure, the same can be usable in snow of a depth considerably greater than that of the diameter of the auger assembly 38 which is necessary due to the limited power output of the lawn mower structure for snow removal.

It is noted that the intermediate, drive adapter assembly 84 provides for the power provided to opposite ends of the auger driven shaft 33 to provide for more effective and balance rotation of the auger assembly 38. Additionally, the snow guard assembly 101 about the pulley and belt member of the intermediate drive adapter assembly 84 is necessary for the efficient and effective operation through snow and ice conditions.

It is seen that the snowblower adapter means of this invention provides a structure which can be readily attached to conventional lawn mower structures in order to utilize the same during months when such is normally inactive and in a storage condition. This invention achieves the snow removal operation which will thereupon place a snowblower adapter means in the hands of all home owners who have a lawn mower structure so as to utilize the same for removing snow from driveways, walks, etc., in a most relaxing and easy manner. Additionally, the snowblower adapter means of this invention may be secured to numerous lawn mower structures in an efficient and effective manner and having the same of a low cost construction but highly efficient in operation. Additionally, it is part of this invention to construct the blower assembly out of a plastic material which is available and resistant to any packing or adhering of the snow to this structure which is most desirable in providing for the efficient and effective removal of the snow with the limited power available. The auger assembly would also be constructed of the non-adhering plastic material for best operation.

While the invention has been described in conjunction with preferred specific embodiments thereof, be it understood that this description is tended to illustrate and not to limit the scope of the invention, which can be defined by the following claims.

I claim:

1. A snowblower adapter means adapted to be connected to a lawn mower structure having an upright, powered, drive shaft, comprising:
   a. a blower assembly connected to a forward portion of the lawn mower structure by a mounting assembly,
   b. said blower assembly includes a housing assembly mounted about an auger assembly rotatably connected to said housing assembly,
   c. a drive adapter assembly to connect said drive shaft to said auger assembly,
   d. said housing assembly including a first semi-circular section mounted about said auger assembly and an integral, upper flange section to contact and direct the deeper snow downwardly into said auger assembly for snow removal,
   e. said auger assembly having a central driven auger shaft rotatably mounted in said housing assembly, propeller members secured to outer ends of said auger shaft, auger blade members secured to said auger shaft and extended inwardly from said propeller members, and a central discharge paddle blade to throw snow upwardly through a discharge assembly which is part of said housing assembly,
   f. said propeller members having inwardly inclined blade sections to move the snow inwardly on contact therewith, and g. said drive adapter assembly including a first pulley secured to the drive shaft, a second pulley secured to said auger assembly, and a belt member mounted about said first and second pulleys to drive said auger assembly, h. said mounting assembly having a main connector block secured to the lawn mower structure and a pair of connector members, one of which is adjustably connected to said connector block and the other is secured to said blower assembly, and i. said one connector member is movably vertically to any desired height and said other connector member is adjustably connected to said one connector member for horizontal adjustment movement.

2. A snowblower adapter means adapted to be connected to a lawn mower structure having an upright, powered, drive shaft, comprising:

a. a blower assembly connected to a forward portion of the lawn mower structure by a mounting assembly, b. said blower assembly includes a housing assembly mounted about an auger assembly rotatably connected to said housing assembly, c. a drive adapter assembly to connect said drive shaft to said auger assembly, d. said housing assembly including a first semicircular section mounted about said auger assembly and an integral, upper flange section to contact and direct the deeper snow downwardly into said auger assembly for snow removal, e. said drive adapter assembly including an intermediate adapter assembly having a pulley member secured to the drive shaft, an intermediate pulley secured to an intermediate drive shaft rotatably mounted on said housing assembly, a belt mounted on said pulley member and said intermediate pulley, and a belt and pulley assembly connected to outer ends of said intermediate drive shaft and said auger assembly for powering same, f. said belt and pulley assembly having pairs of driven pulleys interconnected by respective driven belts, one pair of said driven pulleys each secured to outer ends of said intermediate drive shaft, g. said auger assembly having a central auger shaft rotatably mounted in said housing assembly, and the other pair of said driven pulleys each secured to outer ends of said auger shaft, h. a snow guard assembly mounted between said driven pulleys and said driven belts to maintain same free of snow during operation, i. said mounting assembly having a main connector block secured to the lawn mower structure and a pair of connector members, one of which is adjustably connected to said connector block and the other is secured to said blower assembly, and j. said one connector member is movably vertically to any desired height and said other connector member is adjustably connected to said one connector member for horizontal adjustable movement.

* * * * *